US011315545B2

(12) United States Patent
Wintrode

(10) Patent No.: US 11,315,545 B2
(45) Date of Patent: *Apr. 26, 2022

(54) SYSTEM AND METHOD FOR LANGUAGE IDENTIFICATION IN AUDIO DATA

(71) Applicant: RAYTHEON APPLIED SIGNAL TECHNOLOGY, INC., Sunnyvale, CA (US)

(72) Inventor: Jonathan C. Wintrode, Annapolis, MD (US)

(73) Assignee: RAYTHEON APPLIED SIGNAL TECHNOLOGY, INC., Sunnyvale, CA (US)

(*) Notice: Subject to any disclaimer, the term of this patent is extended or adjusted under 35 U.S.C. 154(b) by 105 days.

This patent is subject to a terminal disclaimer.

(21) Appl. No.: 16/924,564

(22) Filed: Jul. 9, 2020

(65) Prior Publication Data
US 2022/0013107 A1 Jan. 13, 2022

(51) Int. Cl.
G10L 15/00 (2013.01)
G10L 15/08 (2006.01)
G10L 25/78 (2013.01)

(52) U.S. Cl.
CPC .......... *G10L 15/005* (2013.01); *G10L 15/08* (2013.01); *G10L 25/78* (2013.01)

(58) Field of Classification Search
CPC ........ G10L 15/005; G10L 15/08; G10L 25/78
USPC ........................................................... 704/8
See application file for complete search history.

(56) References Cited

U.S. PATENT DOCUMENTS

| 6,542,869 B1 | 4/2003 | Foote |
| 7,337,115 B2 | 2/2008 | Liu et al. |
| 7,437,284 B1* | 10/2008 | Margulies ............. G06F 40/263 704/7 |

(Continued)

FOREIGN PATENT DOCUMENTS

WO 2016189307 A1 12/2016

OTHER PUBLICATIONS

Snyder et al., "X-Vectors: Robust DNN Embeddings for Speaker Recognition," Center for Language and Speech Processing & Human Language Technology Center of Excellence, The John Hopkins University, Baltimore, Maryland, USA.

(Continued)

*Primary Examiner* — Thuykhanh Le
(74) *Attorney, Agent, or Firm* — Burns & Levinson, LLP; Joseph M. Maraia

(57) ABSTRACT

A system for identifying a language in audio data includes a feature extraction module for receiving an unknown input audio data stream and dividing the unknown input audio data stream into segments. A similarity module receives the segments and receives known-language audio data models for known languages. For each segment, the similarity module performs comparisons between the segment and the known-language audio data models and generates probability values representative of the probabilities that the segment includes audio data of the known languages. A processor receives the probability values for each segment and computes an entropy value for the probabilities for each segment. If the entropy value for a segment is less than the entropy value for a previous segment, the processor terminates the comparisons prior to completing comparisons for all segments.

12 Claims, 12 Drawing Sheets

(56) References Cited

U.S. PATENT DOCUMENTS

| | | | |
|---|---|---|---|
| 7,801,910 | B2 | 9/2010 | Houh et al. |
| 10,388,272 | B1* | 8/2019 | Thomson ............ G10L 15/063 |
| 10,402,500 | B2* | 9/2019 | Chochowski .......... G10L 17/00 |
| 10,573,312 | B1* | 2/2020 | Thomson ............... G10L 15/26 |
| 11,176,934 | B1* | 11/2021 | Venkatesh Raman ...................... G10L 15/005 |
| 2001/0012998 | A1* | 8/2001 | Jouet ...................... G10L 15/08 704/248 |
| 2004/0083104 | A1 | 4/2004 | Liu et al. |
| 2006/0206310 | A1* | 9/2006 | Ravikumar ............ G06F 40/58 704/9 |
| 2007/0112837 | A1 | 5/2007 | Houh et al. |
| 2010/0125448 | A1* | 5/2010 | Goswami ............. G06F 40/263 704/8 |
| 2010/0191530 | A1* | 7/2010 | Nakano ................... G10L 15/32 704/244 |
| 2012/0017146 | A1* | 1/2012 | Travieso .............. G06F 40/117 715/265 |
| 2012/0323573 | A1* | 12/2012 | Yoon ...................... G09B 19/06 704/236 |
| 2013/0311190 | A1* | 11/2013 | Reiner .................... G10L 25/48 704/270 |
| 2015/0194147 | A1* | 7/2015 | Yoon ...................... G09B 19/06 704/236 |
| 2015/0228279 | A1* | 8/2015 | Biadsy ................... G10L 15/26 704/235 |
| 2016/0042739 | A1 | 2/2016 | Cumani et al. |
| 2016/0240188 | A1* | 8/2016 | Seto ...................... G06F 40/242 |
| 2016/0267904 | A1* | 9/2016 | Biadsy ................... G10L 15/08 |
| 2017/0011735 | A1* | 1/2017 | Kim ........................ G10L 15/005 |
| 2017/0061002 | A1 | 3/2017 | Roblek et al. |
| 2017/0092266 | A1* | 3/2017 | Wasserblat ............ G10L 15/14 |
| 2017/0294192 | A1 | 10/2017 | Bradley et al. |
| 2017/0365251 | A1* | 12/2017 | Park ........................ G10L 15/14 |
| 2018/0012594 | A1* | 1/2018 | Behzadi ................. G10L 15/14 |
| 2018/0053502 | A1* | 2/2018 | Biadsy ................... G10L 15/32 |
| 2018/0061412 | A1* | 3/2018 | Cho ......................... G06F 3/167 |
| 2018/0068653 | A1* | 3/2018 | Trawick ................ G10L 15/142 |
| 2018/0174600 | A1 | 6/2018 | Chaudhuri et al. |
| 2018/0342239 | A1* | 11/2018 | Baughman ............ G10L 15/063 |
| 2018/0357998 | A1* | 12/2018 | Georges ................. G10L 15/14 |
| 2018/0374476 | A1* | 12/2018 | Lee ........................ G06F 3/167 |
| 2019/0108257 | A1* | 4/2019 | Lefebure ............ G06F 16/3329 |
| 2019/0138539 | A1* | 5/2019 | Moreno Mengibar ...................... G06F 16/211 |
| 2019/0304470 | A1 | 10/2019 | Ghaemmaghami et al. |
| 2019/0371318 | A1* | 12/2019 | Shukla .................... G10L 15/32 |
| 2019/0385589 | A1* | 12/2019 | Muramatsu ........... G10L 15/005 |
| 2020/0021949 | A1 | 1/2020 | Edge et al. |
| 2020/0027444 | A1* | 1/2020 | Prabhavalkar ........ G10L 15/183 |
| 2020/0035739 | A1 | 1/2020 | Saito et al. |
| 2020/0074992 | A1* | 3/2020 | Xiong ..................... G10L 25/78 |
| 2020/0111476 | A1* | 4/2020 | Kamano ................. G10L 15/02 |
| 2020/0175961 | A1* | 6/2020 | Thomson ............ G06F 21/6245 |
| 2020/0219492 | A1* | 7/2020 | Apsingekar .............. G06N 3/08 |
| 2020/0243094 | A1* | 7/2020 | Thomson ................ G10L 15/22 |
| 2020/0293875 | A1 | 9/2020 | Zhang et al. |
| 2020/0357391 | A1* | 11/2020 | Ghoshal ................ G10L 15/005 |
| 2020/0380215 | A1* | 12/2020 | Kannan .................. G10L 15/26 |
| 2020/0387677 | A1* | 12/2020 | Kim ........................ G06F 40/40 |
| 2021/0232776 | A1* | 7/2021 | Kim ........................ G10L 15/22 |

OTHER PUBLICATIONS

Snyder et al., "X-vectors: Robust DNN embeddings for speaker recognition," in Proc. IEEE ICASSP, 2018.

Dehak et al., "Front-end factor analysis for speaker verification," IEEE Transactions on Audio, Speech, and Language Processing, vol. 19, No. 4, pp. 788-798, 2011.

Kinnunen, et al., "Real-time speaker identification and verification." IEEE Transactions on Audio, Speech, and Language Processing, vol. 14, No. 1, 277-288, 2005.

Kinnunen et al., "A speaker pruning algorithm for real-time speaker identification," in International Conference on Audio-and Video-Based Biometric Person Authentication. Springer, 639-646, 2003.

Sarkar et al., "Fast Approach to Speaker Identification for Large Population using MLLR and Sufficient Statistics," in 2010 National Conference on Communications (NCC) IEEE, 1-5, 2010.

Schmidt et al., "Large-scale Speaker Identification," in Proc. of International Conference on Acoustics, Speech and Signal Processing (ICASSP) IEEE, 1650-1654, 2014.

Zhu et al., "Self-attentive Speaker Embeddings for Text-Independent Speaker Verification," INTERSPEECH, 2018.

David Snyder, "SRE16 Xvector Model," http://kaldi-asr.org/models/m3, 2017, Accessed: Oct. 10, 2018.

He et al., "Streaming End-to-End Speech Recognition for Mobile Devices," ICASSP 2019-2019 IEEE International Conference on Acoustics, Speech and Signal Processing (ICASSP), May 12-17, 2019.

Chen et al., "Query-by-Example Keyword Spotting Using Long Short-Term Memory Networks," IEEE International Conference on Acoustics, Speech and Signal Processing (ICASSP), Apr. 19-24, 2015.

Zhang et al., "Unsupervised Spoken Keyword Spotting Via Segmental DTW on Gaussian Posteriorgrams," Proceedings of the Automatic Speech Recognition & Understanding (ASRU) Workshop, IEEE, 2009, 398-403.

Miller et al., "Rapid and Accurate Spoken Term Detection," Proceedings of Interspeech, ISCA, 2007, pp. 314-317.

International Search Report and Written Opinion for International Application No. PCT/US2020/066298 dated Mar. 26, 2021.

\* cited by examiner

SYSTEM AND METHOD FOR LANGUAGE IDENTIFICATION IN AUDIO DATA

BACKGROUND

1. Technical Field

The present disclosure is related to audio data processing and, in particular, to a system and method for identifying a spoken language in audio data which reduce processing time and improve identification efficiency and throughput.

2. Discussion of Related Art

In audio data processing, it is often desirable to identify the language being spoken by a speaker in the audio data. Language identification (LID) is the labeling of audio data (recording) with the identity of the language being spoken. Conventionally, language identification can require a large amount of processing resources due to the amount of audio data typically being analyzed to make the identification determination.

SUMMARY

According to a first aspect, a system for identifying a language in audio data is provided. The system includes a feature extraction module for receiving an unknown input audio data stream and dividing the unknown input audio data stream into a plurality of segments of unknown input audio data. A similarity module receives the plurality of segments of the unknown input audio data and receives a plurality of known-language audio data models for a respective plurality of known languages. For each segment of the unknown input audio data, the similarity module performs comparisons between the segment of unknown input audio data and the plurality of known-language audio data models and generates a respective plurality of probability values representative of the probabilities that the segment includes audio data of the known languages. A processor receives the plurality of probability values for each segment and computes an entropy value for the probabilities for each segment. If the entropy value for a segment is less than the entropy value for a previous segment, the processor terminates the comparisons prior to completing comparisons for all segments of the unknown input audio data.

According to some exemplary embodiments, each segment of unknown audio data comprises an unknown data vector comprising a plurality of data values associated with the segment of unknown input audio data; and each known-language audio data model comprises a known data vector comprising a plurality of data values associate with the known-language audio data model.

According to some exemplary embodiments, the feature extraction module comprises a deep neural network.

According to some exemplary embodiments, the similarity module performs a probabilistic linear discriminant analysis (PLDA) in generating the plurality of probability values.

According to some exemplary embodiments, extents of each segment are defined by a time duration. Alternatively, extents of each segment are defined by a quantity of data in the segment.

According to another aspect, a method for identifying a language in audio data is provided. The method comprises: (i) receiving, at a feature extraction module, an unknown input audio data stream and dividing the unknown input audio data stream into a plurality of segments of unknown input audio data; (ii) receiving, at a similarity module, the plurality of segments of the unknown input audio data and receiving, at the similarity module, a plurality of known-language audio data models for a respective plurality of known languages, for each segment of the unknown input audio data, the similarity module performing comparisons between the segment of unknown input audio data and the plurality of known-language audio data models and generating a respective plurality of probability values representative of the probabilities that the segment includes audio data of the known languages; (iii) computing an entropy value for the probabilities for each segment; and (iv), if the entropy value for a segment is less than the entropy value for a precious segment, terminating the comparisons prior to completing comparisons for all segments of the unknown input audio data.

According to some exemplary embodiments, each segment of unknown audio data comprises an unknown data vector comprising a plurality of data values associated with the segment of unknown input audio data; and each known-language audio data model comprises a known data vector comprising a plurality of data values associate with the known-language audio data model.

According to some exemplary embodiments, the feature extraction module comprises a deep neural network.

According to some exemplary embodiments, the similarity module performs a probabilistic linear discriminant analysis (PLDA) in generating the plurality of probability values.

According to some exemplary embodiments, extents of each segment are defined by a time duration. Alternatively, extents of each segment are defined by a quantity of data in the segment.

BRIEF DESCRIPTION OF THE DRAWINGS

The present disclosure is further described in the detailed description which follows, in reference to the noted plurality of drawings by way of non-limiting examples of embodiments of the present disclosure, in which like reference numerals represent similar parts throughout the several views of the drawings.

DETAILED DESCRIPTION

Language identification (LID) is the labeling of an audio data (recording) with the identity of a language being spoken by a person whose speech is contained within the audio. Current approaches to LID typically include an offline component (training) and a runtime component (recognition). The "fast forward" approach of the current disclosure improves this architecture by speeding up the recognition component.

Current LID systems perform recognition of a new audio recording by applying a feature extraction module, which computes a low-dimensional feature vector from the entire recoding duration. This feature vector is compared, using a similarity function, to a set of known feature vectors, one feature vector per target language. The similarities between the compared unknown feature vector and the known-language feature vectors are output as the probabilities of detection for each of the multiple languages being compared.

In the "fast-forward" approach of the present disclosure, the above system flow is substantially improved upon such that language detections/determinations are reported without using the entire unknown audio recording. According to the present disclosure, a feature vector is computed on each of one or more segments, i.e., "chunks," of the new unknown audio. That is, according to the approach of the disclosure, a feature vector for the entire audio recording is not generated. The similarity function is applied to these individual segment feature vectors, and probabilities between the segment feature vectors and each the known feature vectors for each language are obtained. For each segment, the entropy of the set of probabilities is computed. If the entropy from one segment to the next decreases, then the certainty of the language with the highest similarity being the correct determination increases to the point that the most likely language will not change with more data. With this conclusion, processing is stopped early, i.e., before the entire unknown audio recording is processed. This approach of the present disclosure reduces the amount of audio data needed at runtime to make a language designation, which directly reduces the processing cost and resources in terms of computation cycles. According to the present disclosure, using incremental processing and entropy-based processing termination, the overall computation load is reduced, and processing speed is increased. The approach of the present disclosure can be implemented as an add-on module that enhances the runtime performance of an existing language identification system.

Figure 1:
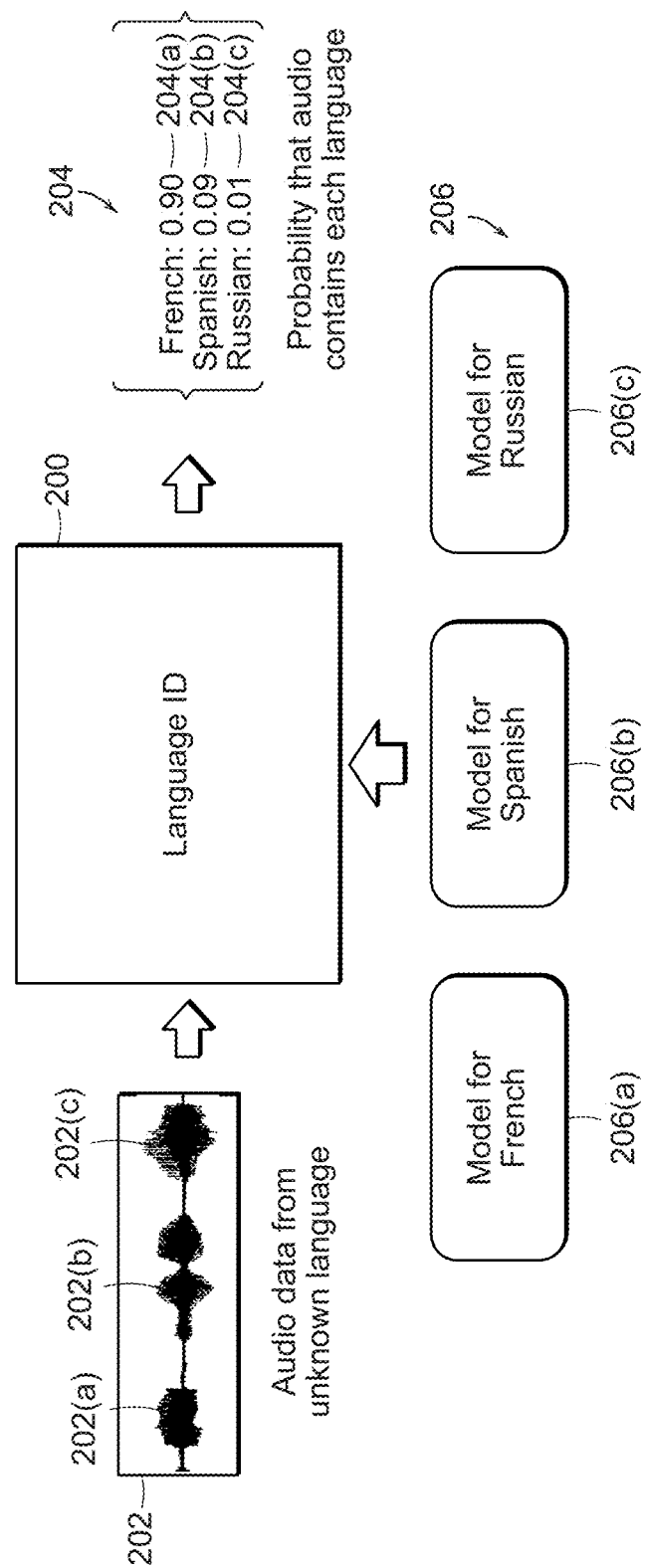
FIG. 1 includes a schematic functional block diagram of a language identification system 200, according to some exemplary embodiments.

FIG. 1 includes a schematic functional block diagram of a language identification system 200, according to some exemplary embodiments. Referring to FIG. 1, system 200 takes in recorded audio data 202, which includes segments or "chunks" 202(a), 202(b), 202(c), from an unknown speaker of any length, which, in some particular exemplary embodiments, is in the form of a .wav file. System 200 also takes in language model data 206 for known languages, for example, as illustrated in FIG. 1, model data 206 can include language model data for the French language 206(a), language model data for the Spanish language 206(b), and language model data for the Russian language 206(c). Model data 206 represent what makes each of the respective known languages distinct from other known languages. Outputs 204 from system 200 include scores which represent probabilities that the input audio segment 202(a), 202(b), 202(c) currently being processed includes the known languages. For example, as illustrated in FIG. 1, outputs 204 include a probability score 204(a) that the input audio segment includes French; a probability score 204(b) that the input audio segment includes Spanish; and a probability score 204(c) that the input audio segment includes Russian.

Figure 2A:
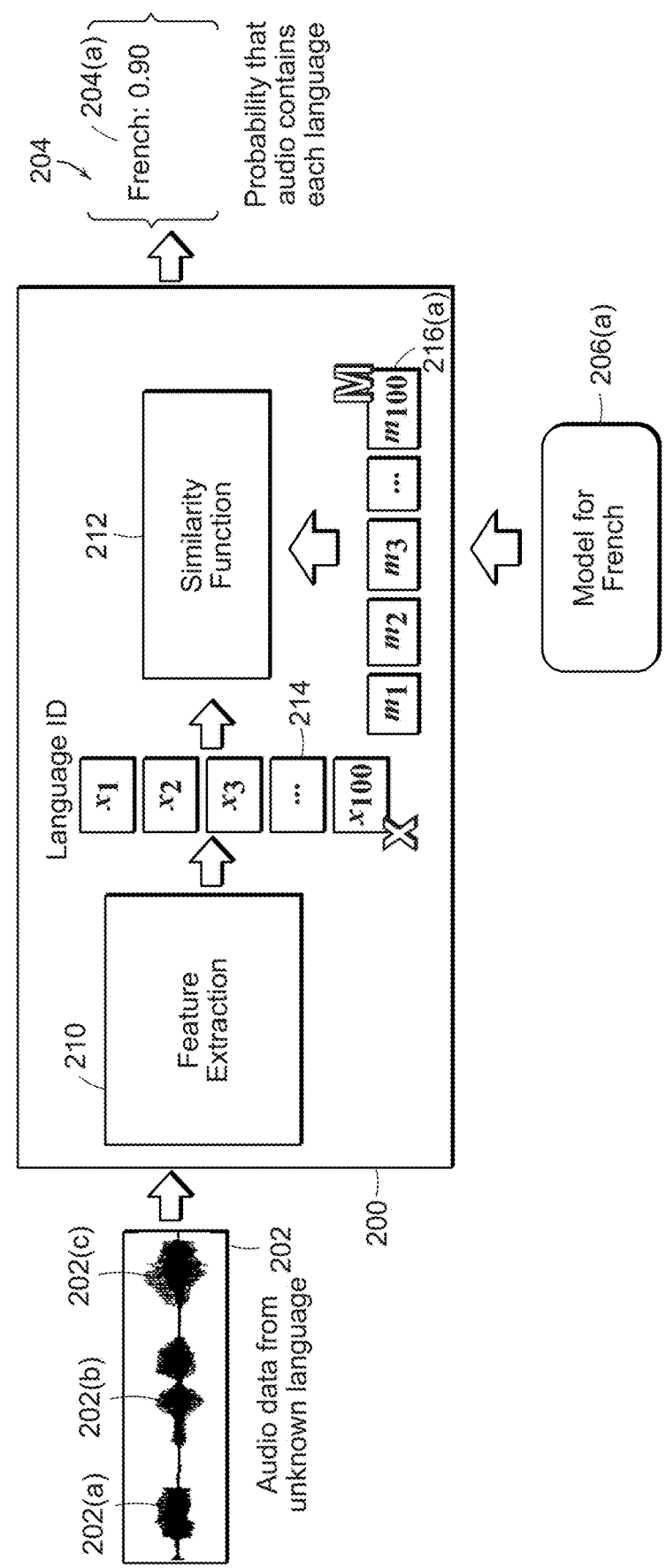
FIGS. 2A through 2C include schematic functional block diagrams illustrating language identification system 200 of FIG. 1, carrying out language identification, according to some exemplary embodiments.
Figure 2B:
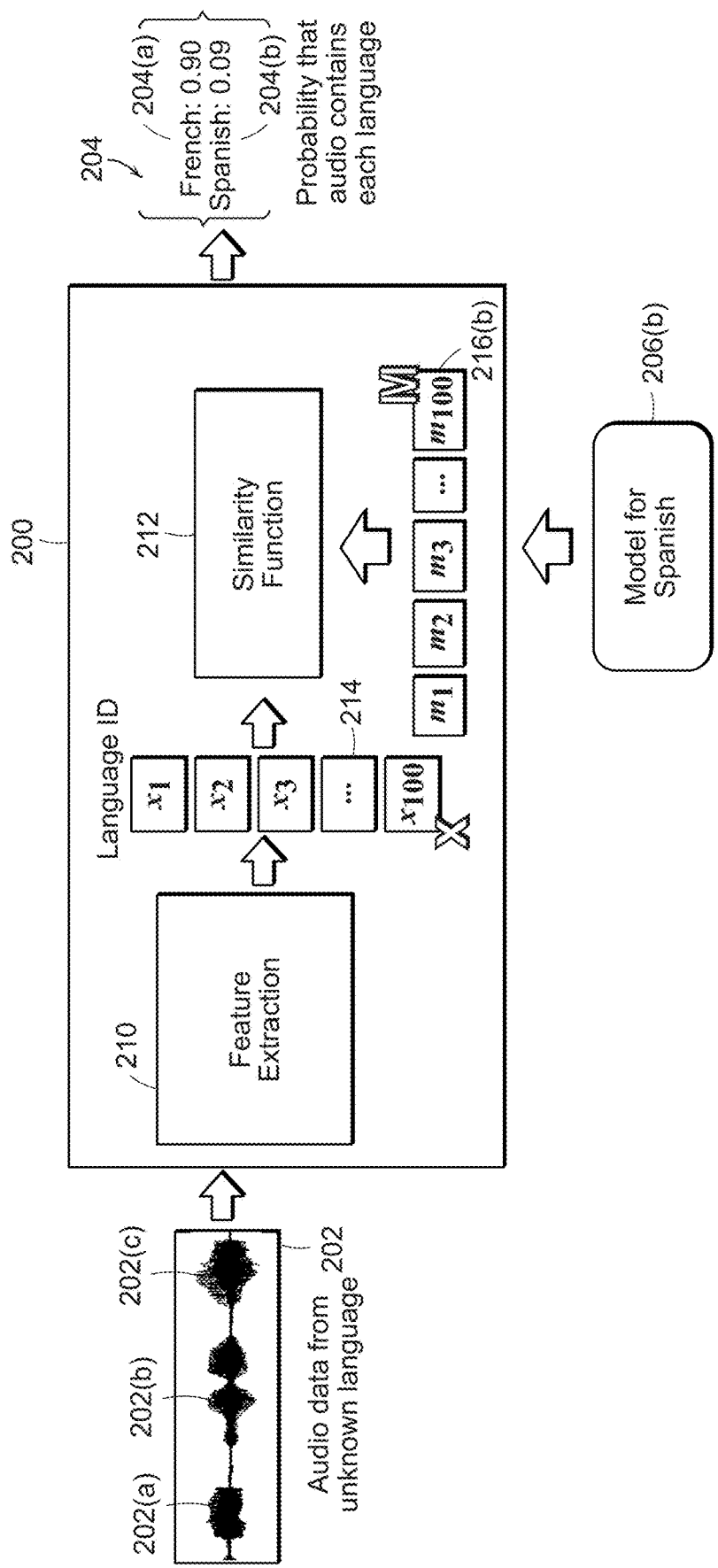
Figure 2C:
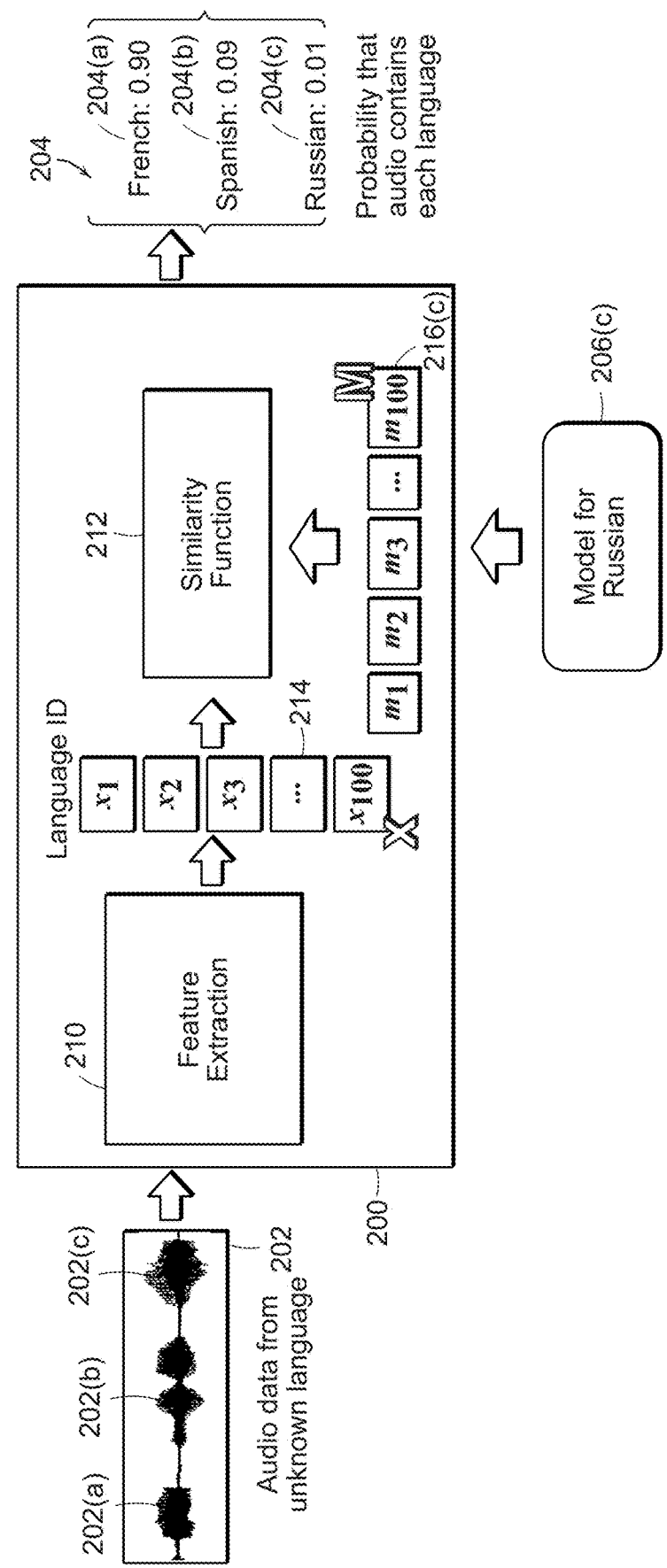

According to some exemplary embodiments, the approach to language identification is carried out in two stages, namely, a feature extraction stage and a similarity function stage. FIGS. 2A through 2C include schematic functional block diagrams illustrating language identification system 200 of FIG. 1, carrying out language identification, according to some exemplary embodiments. Referring to FIGS. 2A-2C, speaker identification system 200 includes feature extraction module 210 and similarity function module 212. Audio input data 202, which includes segments or "chunks" 202(a), 202(b), 202(c), processed one at a time, is provided to feature extraction module 210, which outputs a feature vector 214, denoted X, which in some exemplary embodiments is a fixed-length list of decimal values $x_i$. In some exemplary embodiments, feature X-vector 214 includes 100 decimal values $x_1, x_2, \ldots, x_{100}$. X-vector 214 represents audio data of the segment 202(a), 202(b), 202(c) being processed. X-vector 214 is then input to similarity function module 212, which measures the distance between feature X-vector 214 and known language model data 206 M-vectors 216. These distance, or similarity scores, are normalized so that they sum to 1.0 and can be interpreted as probabilities.

In the embodiment illustrated in FIGS. 2A-2C, an M-vector 216 is generated for each know language model. That is, as shown in FIG. 2A, a French M-vector 216(a) is generated from known French language model data 206(a); as shown in FIG. 2B, a Spanish M-vector 216(b) is generated from known Spanish language model data 206(b); and, as shown in FIG. 2C, a Russian M-vector 216(c) is generated from known Russian language model data 206(c). Similarity function module 212 computes a distance between the X-vector 214 for the current input data segment 202(a), 202(b), 202(c) being processed and M-vector 216 for each language in language model data 206, generates therefrom a probability that the current input audio data segment 202(a), 202(b), 202(c) being processed includes the language represented by each M-vector 216(a), 216(b), 216(c), and outputs the probability as a probability scored. For example, referring to FIG. 2A, the probability score indicating the probability that the current input audio data segment 202(a), 202(b), 202(c) being processed includes French is 0.90; referring to FIG. 2B, the probability score indicating the probability that the current input audio data segment 202(a), 202(b), 202(c) being processed includes Spanish is 0.09; and, referring to FIG. 2C, the probability score indicating the probability that the current input audio data segment 202(a), 202(b), 202(c) being processed includes Russian is 0.01.

The feature extraction process 210, which generates the input audio data segments, is the slowest and most processing-intensive part of the process. According to the approach of the present disclosure, the amount of input audio data, i.e., the number of input audio data segments, required to be processed to arrive at a language identification is substantially reduced, resulting in a more efficient language identification process and system.

It will be understood that either or both of feature extraction module 210 and similarity function module 212 include all of the processing capabilities required to carry out their individual functions and the overall functions of language identification system 200, as described herein in detail. These processing capabilities can be implemented in either or both modules 210, 212, and can include for example, one or more dedicated processors, memories, input/output devices, interconnection devices, and any other required devices or subsystems. Alternatively, these modules 210, 212 and system 200 can be implemented on a general purpose computer executing instructions to implement the technology described herein.

Feature extraction module 210 takes audio 202 as input, and outputs a fixed-dimensional feature vector 214, i.e., X-vector as shown in FIGS. 2A-2C. By fixed-dimensional, what is meant is that audio of any length (5 sec, 10 sec, 60 sec) is transformed into a vector made up of the same number of decimal values (typically 100-500).

$$X = \text{Extract}(\text{Audio}) \quad (1)$$

Similarity Module takes two vectors, i.e., unknown audio X-vector 214 and known model audio M-vector 216 as input and outputs a single numeric value that captures the "closeness" of the vectors. For example, a similarity function can be defined as:

$$S = \text{Similarity}(X, Y) \quad (2)$$

The intuition to this function is that the larger the value of S, the "closer", i.e., more similar, X and Y are. Two common geometric similarity functions are the Euclidian distance and Cosine similarity. The distance function is turned into a similarity function by subtracting from 1. The Euclidean distance in two dimensions is another name for the Pythagorean Theorem.

$$S = \text{Similarity}(X, Y) \quad (3)$$

$$S = 1 - \text{Distance}(X, Y) \quad (4)$$

$$S = 1 - \sqrt{(x_1 - y_1)^2 + (x_2 - y_2)^2} \quad (5)$$

Figure 3B:
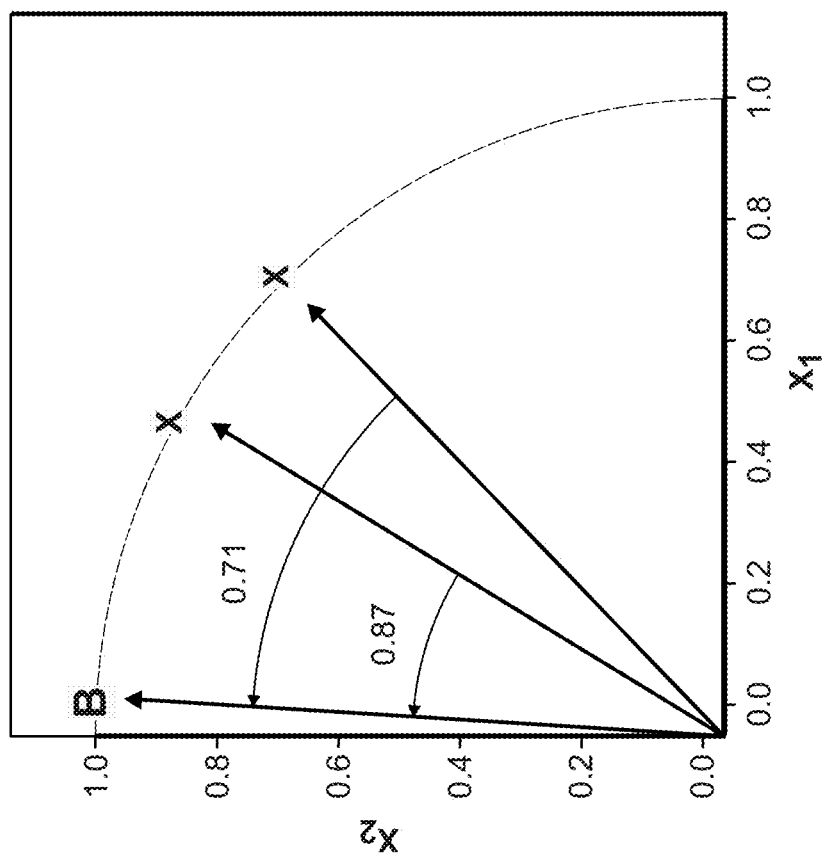
FIG. 3B is a curve illustrating an example of the Cosine similarity function.
Figure 3A:
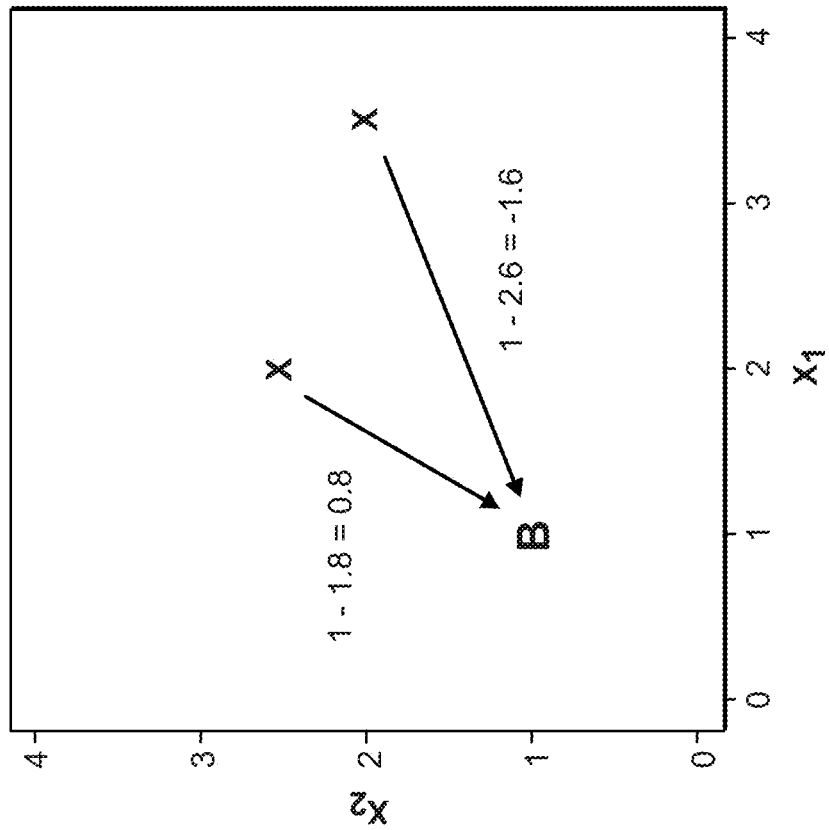
FIG. 3A is a curve illustrating an example of the Euclidean similarity function.

The Cosine similarity captures the angle between two vectors and is a common metric used in high dimensions (greater than 3). FIG. 3A is a curve illustrating an example of the Euclidean similarity function, and FIG. 3B is a curve illustrating an example of the Cosine similarity function. The Cosine similarity quantifies the angle between the two X vectors, starting at the origin, (0,0), and terminating at the points marked X in FIG. 3B, and the vector terminating at the letter B, which represents the speaker model. These metrics are illustrated in two dimensions but have well-defined constructions in higher dimensions.

Probability functions, which return a value of 0 to 1, are also an intuitive set of similarity functions. If there is a probability that X and Y are the same, then the higher the probability S=P(X,Y), the "closer" or more similar X and Y are. In some exemplary embodiments, the similarity function 212 is Probabilistic Linear Discriminant Analysis (PLDA). PLDA is a probability-based metric that is a log-likelihood ratio, a comparison of two probabilities:

$$S = \log\left(\frac{P(\text{Language is French})}{P(\text{Langauge is not French})}\right) \quad (6)$$

PLDA and other log-likelihood ratios range from $-\infty$ to $\infty$, with 0 being the point at which it is completely uncertain whether the unknown audio is the known language. Positive values indicate that it is more likely than not to be the known language, and negative values indicate that it is more likely than not that the unknown audio includes the known language. This fits the requirement for a similarity metric in that larger values of S mean "closer" or "more similar."

Figure 4:
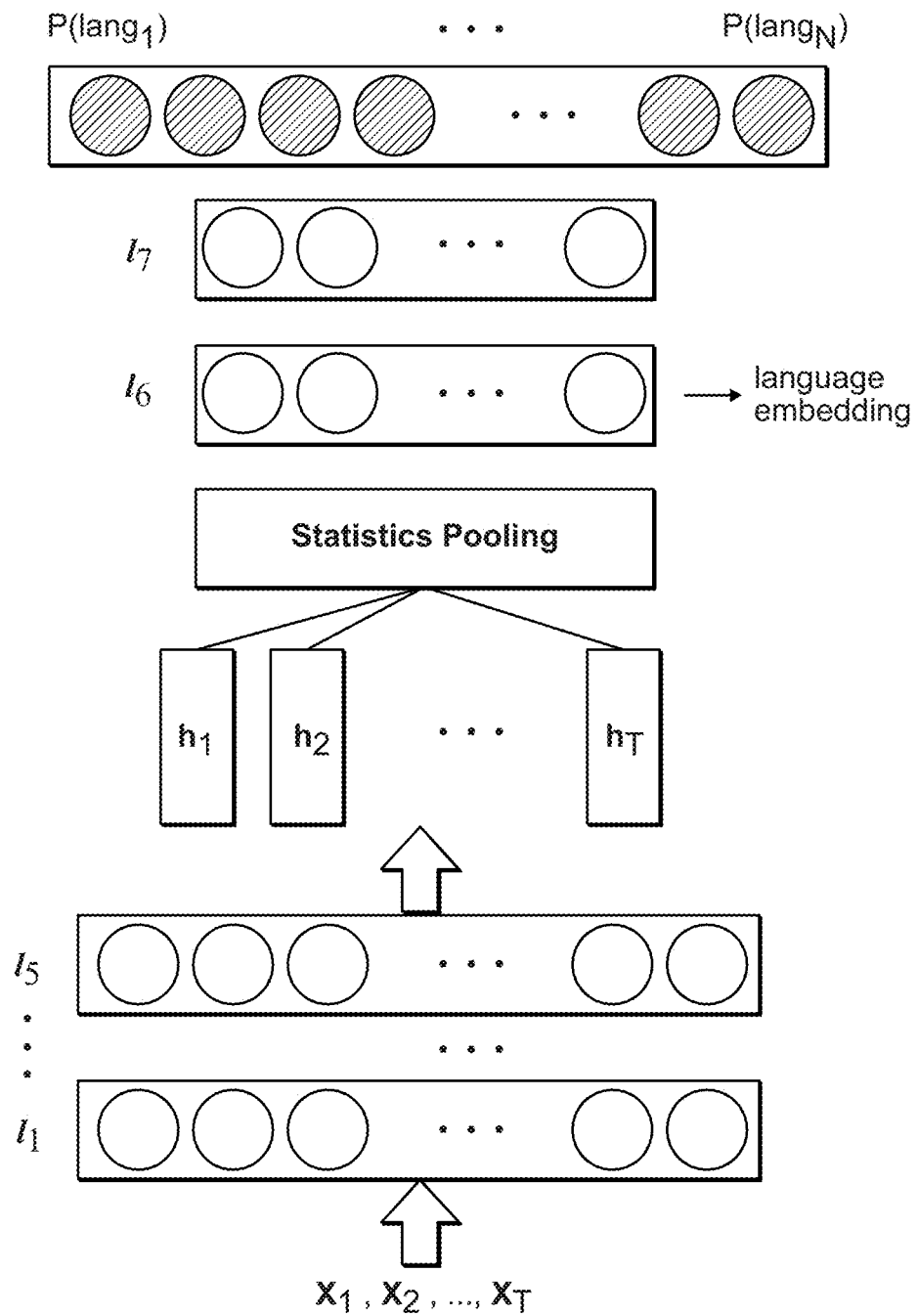
FIG. 4 includes a schematic functional block diagram which illustrates an X-vector neural network structure.

According to some exemplary embodiments, feature extraction module 210 uses the neural network model developed at Johns Hopkins University, which is commonly referred to as an x-vector extractor. This model is well-known in the art, and is described in, for example, D. Snyder, et al., "X Spoken Language Recognition using x-vectors," in Proc. Odyssey, 2018. The x-vector neural network is an extraction function that satisfies the condition for equation 1 but is internally implemented with a neural network. FIG. 4 includes a schematic functional block diagram which illustrates the x-vector neural network structure. FIG. 4 is taken from FIG. 1 of Zhu, et al., "Self-attentive Speaker Embeddings for Text-Independent Speaker Verification," INTERSPEECH 2018. Referring to FIG. 4, the "language embedding" refers to the output feature (segment) vector, and X ($x_1, x_2, \ldots, x_T$) refers to the audio feature input. The network of FIG. 4 is a typical feed-forward network, in that the inputs to each layer (denoted $l_1$ through $l_7$) are multiplied with a weight matrix, followed by the application of a nonlinear function to each output dimension. The output dimensionality for a layer is represented by the number of nodes in that layer. Each node has a weight associated with each input dimension, so each layer can be represented by an M×N dimensional weight matrix, where M is the number of inputs and N the number of outputs. The outputs of layer i are in turn used as the inputs to layer i+1. In FIG. 4, the "speaker embedding" is the output of layer $l_6$.

As illustrated below in detail, adding additional audio data into feature extraction module 210, without re-initializing the network, gives a better estimate of feature vector 214. It is related to the effect in statistical estimation that more data points give a more accurate measurement estimate.

According to the present disclosure, entropy of the probability scores 204 is computed and analyzed to determine whether processing can be stopped before all of the input audio data 202 is processed. Entropy is a measure of uncertainty and is computed over the set of probability scores. Specifically, if the unknown input audio must be one of N known languages, entropy E can be computed from the probability P(j) that the unknown input audio is language j, as follows:

$$E = -\sum_{j=1}^{N} P(j) \cdot \log P(j) \quad (7)$$

Figure 5A:
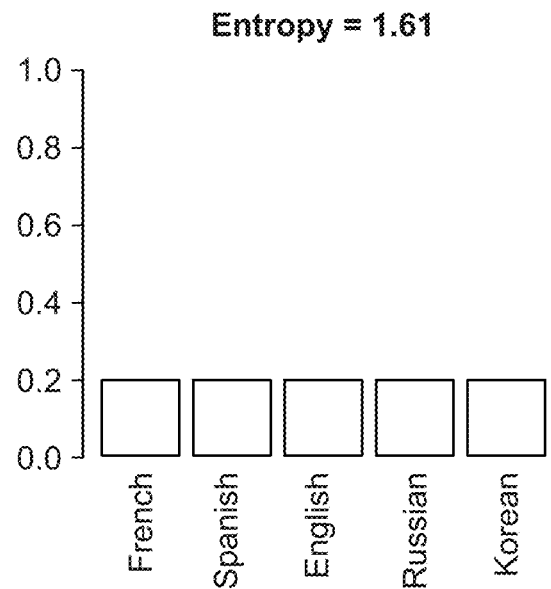
FIGS. 5A through 5D include graphs of probabilities for five exemplary languages, expressed as bar charts, illustrating the relationship between language probability scores and entropies.
Figure 5B:
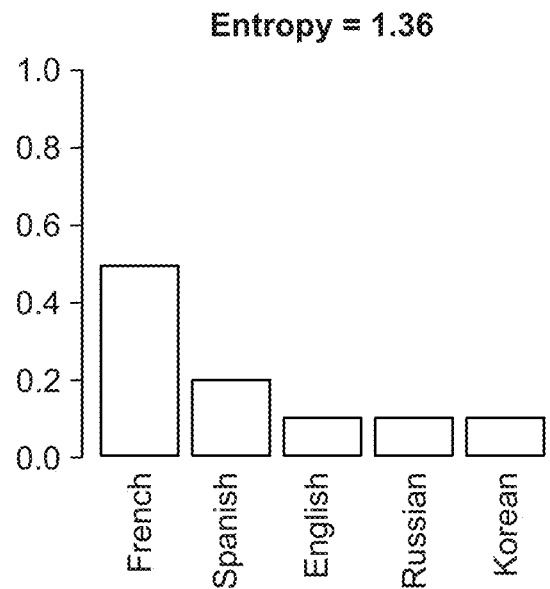
Figure 5C:
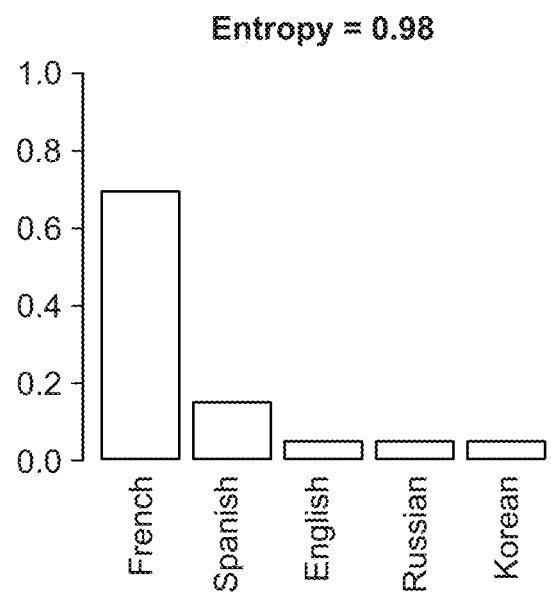
Figure 5D:
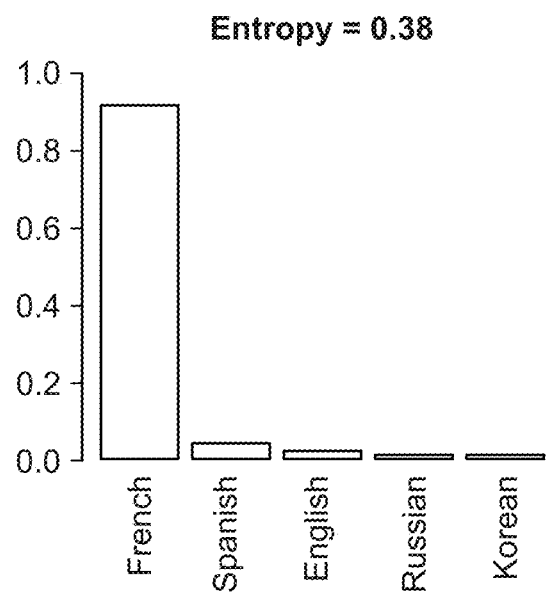

Entropy is mathematically zero when it is entirely certain of one language, for example, if P(French)=1.0. In contrast, entropy is highest when uncertainty is equal across all languages, for example, is P(French)=P(Spanish)=P(Russian)=0.33. FIGS. 5A through 5D include graphs of probabilities for five exemplary languages, expressed as bar charts, illustrating the relationship between language probability scores and entropies. Referring to FIG. 5A, with all languages having an equal probability of 0.2, entropy, i.e., uncertainty, is relatively high at 1.61. FIG. 5B illustrates the case in which one language has a higher probability than the rest of the languages, and the resulting entropy is lower at 1.36. FIG. 5C illustrates the case in which one language is even more dominant, resulting in a lower entropy of 0.98. FIG. 5D illustrates the case in which a single language is very dominant over the others, resulting in very high certainty and, therefore, very low entropy at 0.38.

According to some exemplary embodiments, similarity scores are converted to probabilities, and then the probabilities are converted to entropies. To that end, the similarity scores are first transformed to positive values, preserving their relative magnitudes. Then, each is divided by the sum of the scores, which results in N values that sum to 1.

According to the approach of the present disclosure, as noted above, the two main components of a language identification system, i.e., feature extraction 210 and similarity 212 operations, are used in efficiently producing a language identification in audio data of an unknown language. System 200 receives as inputs the unknown audio 202 and a set of target language models 206, e.g., French 206(a), Spanish (206(b), Russian 206(c). System 200 generates as outputs a set of probabilities for each language.

According to the present disclosure, input audio 202 is broken into multiple adjacent chunks or segments 202(a), 202(b), 202(c) of a particular time duration, for example, c=10 sec, each. For each chunk i from 0 to N (the number of chunks), feature extraction 210 is called to compute a feature vector X[i]. Similarity function 212 is called to compute similarity scores S[i] for each target language model M[j] 206, i.e., Similarity (X[i], M[j]), where j ranges from 1 to L, where L is the number of language models 206, which in the illustrated embodiments is three. The similarity scores are normalized to probabilities P[j] for each language j, as noted above. The entropy of the language probabilities is computed as E[i], for each chunk i. If entropy drops from one chunk to the next succeeding chunk, that is, if $E[i] < E[i-1]$, then processing stops, even if all chunks 202(a), 202(b), 202(c) have not been processed. According to exemplary embodiments, the last set of probability scores P[j] for each language j are returned as the final probability scores for each language.

Figure 6A:
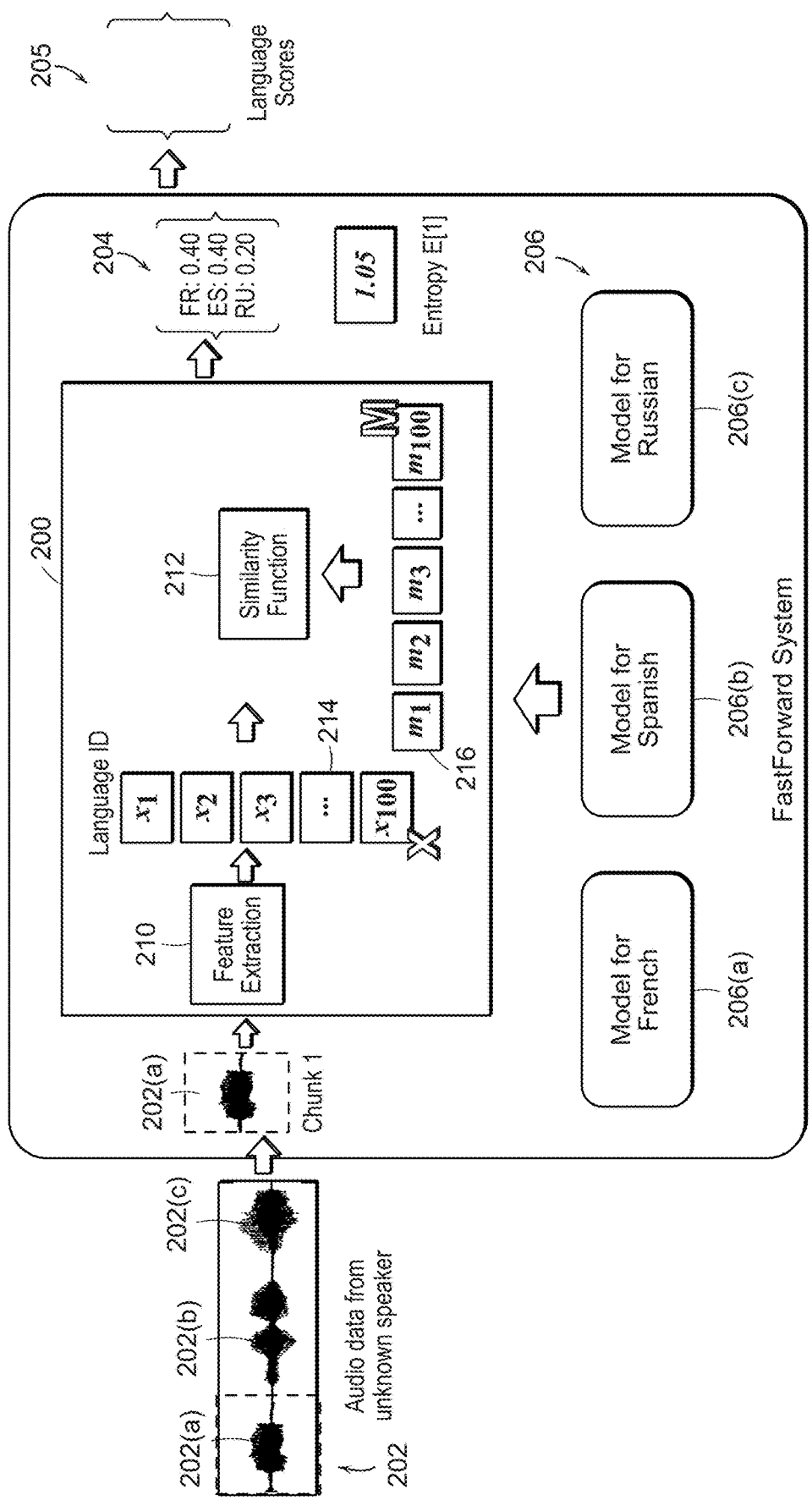
FIGS. 6A through 6C include schematic block diagrams which illustrate identification of a language in unknown audio, after processing all segments of input audio, according to some exemplary embodiments.
Figure 6B:
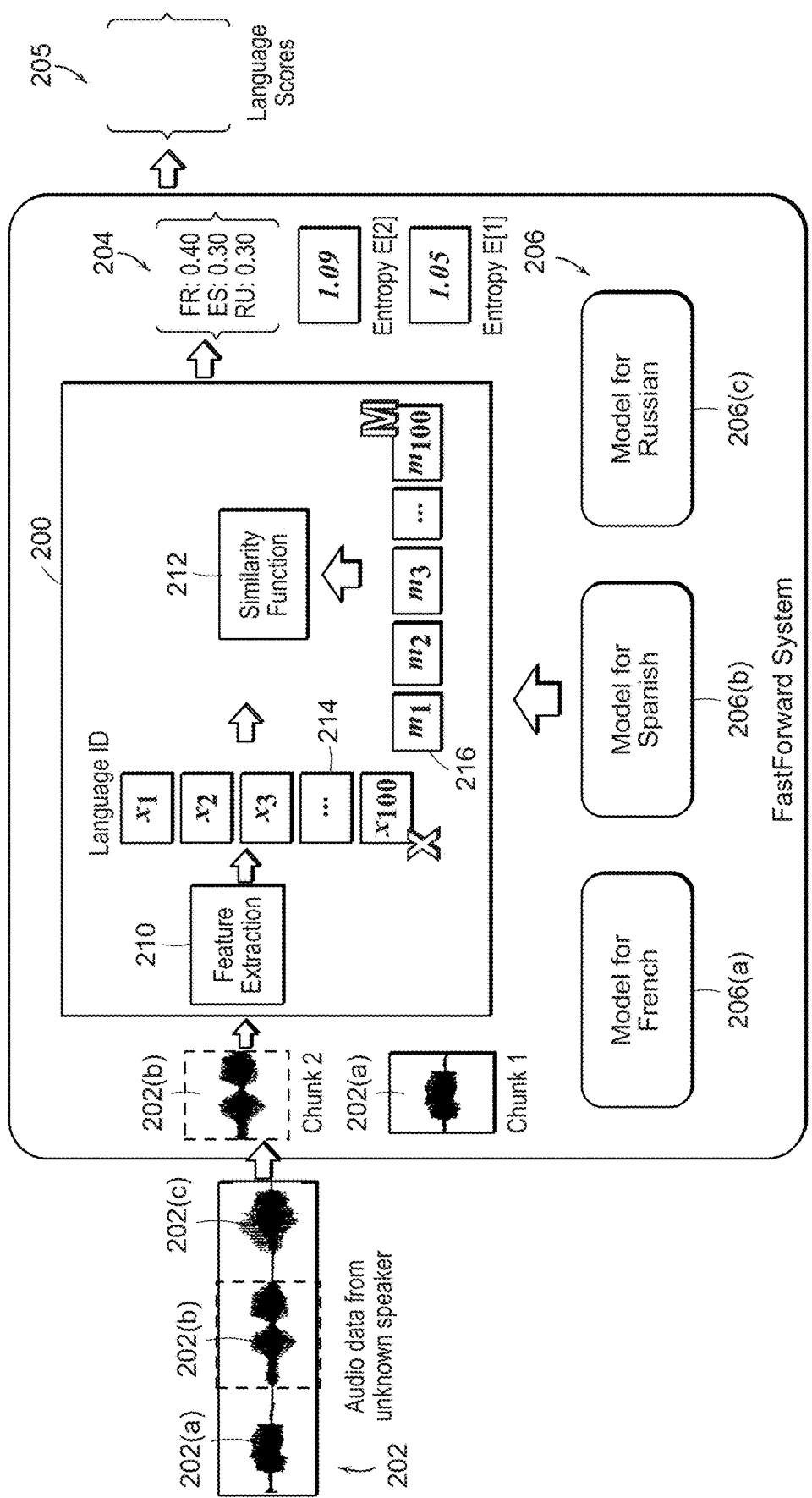
Figure 6C:
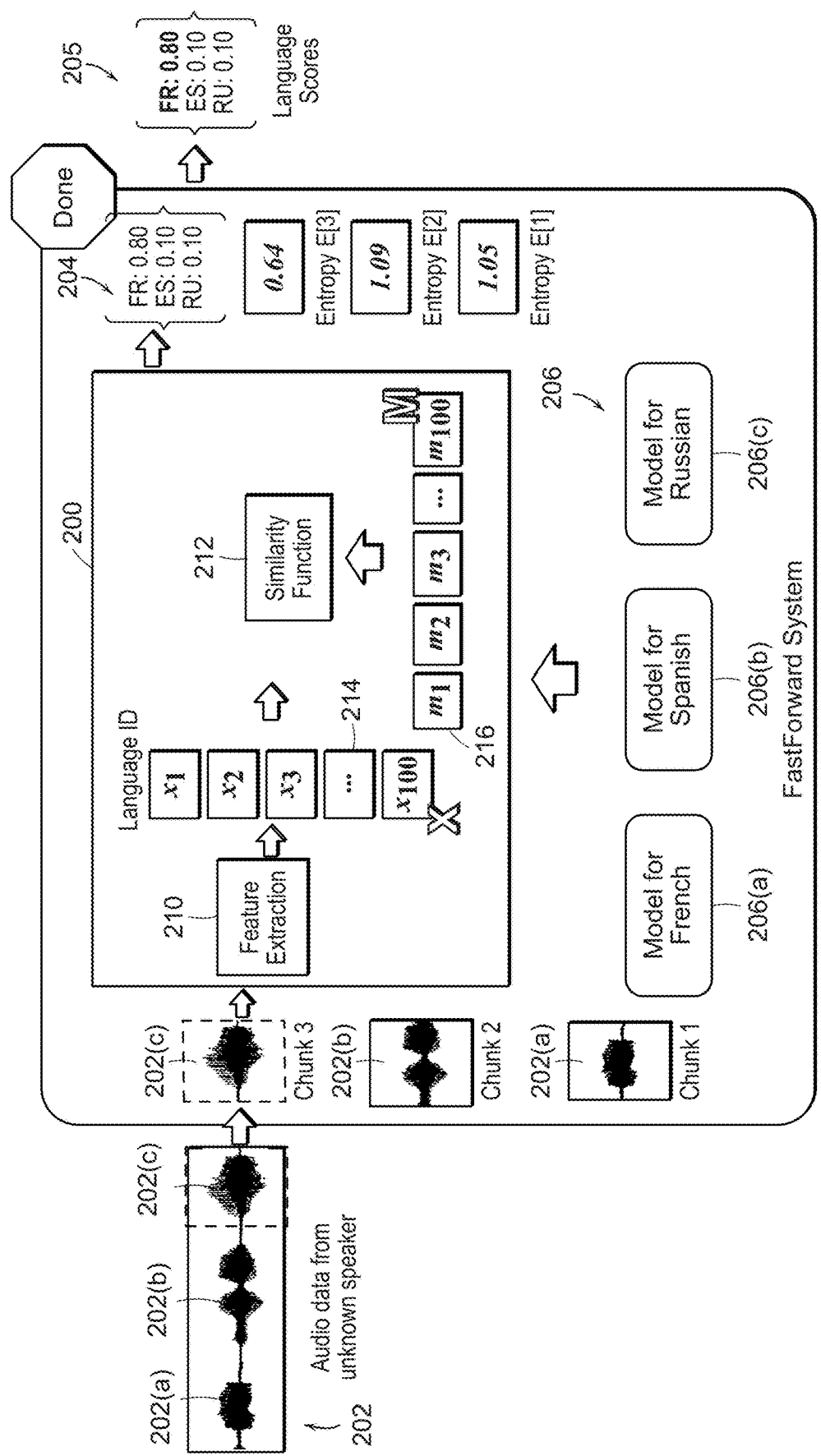

FIGS. 6A through 6C include schematic block diagrams which illustrate identification of a language in unknown audio, after processing all segments of input audio, according to some exemplary embodiments. Referring to FIG. 6A, the processing for the first input audio data segment or chunk 202(a) is illustrated. The calculated probability scores 204 for the first chunk 202(a) are: French—0.40, Spanish—0.40, Russian—0.20. The entropy calculated for these probability scores is 1.05. It is noted that no final probability scores 205 are reported, since the processing has not completed or been terminated.

Next, as illustrated in FIG. 6B, the processing for the second input audio data segment or chuck 202(b) is illustrated. The calculated probability scores 204 for the second chunk 202(b) are: French—0.40, Spanish—0.30, Russian—0.30. The entropy calculated for these probability scores is 1.09. According to the present disclosure, because the entropy increased over the entropy for the previous chunk 202(a), processing will continue to the next chunk 202(c). It is noted that no final probability scores 205 are reported, since the processing has not completed or been terminated.

Next, as illustrated in FIG. 6C, the processing for the third input audio data segment or chuck 202(c) is illustrated. The calculated probability scores 204 for the second chunk 202(c) are: French—0.80, Spanish—0.10, Russian—0.10. The entropy calculated for these probability scores is 0.64. According to the present disclosure, because the entropy decreased over the entropy for the previous chunk 202(b), processing is stopped. Final probability scores 205 are reported as the probability scores 204 for the last chunk 202(c), i.e., French—0.80, Spanish—0.10, Russian—0.10, since the processing has completed.

Figure 7A:
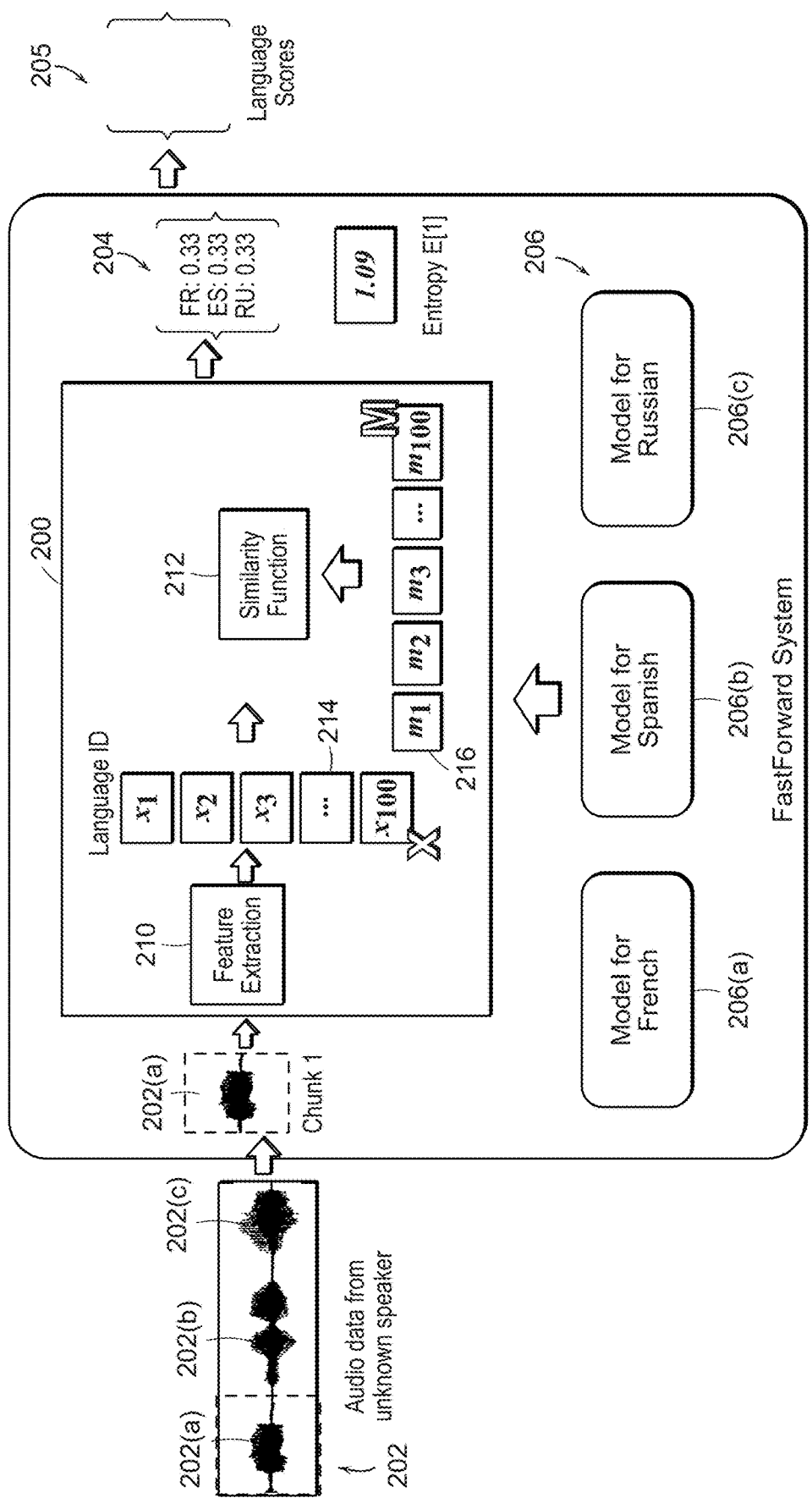
FIGS. 7A through 7B include schematic block diagrams which illustrate identification of a language in unknown audio, after processing fewer than all segments of input audio, according to some exemplary embodiments.
Figure 7B:
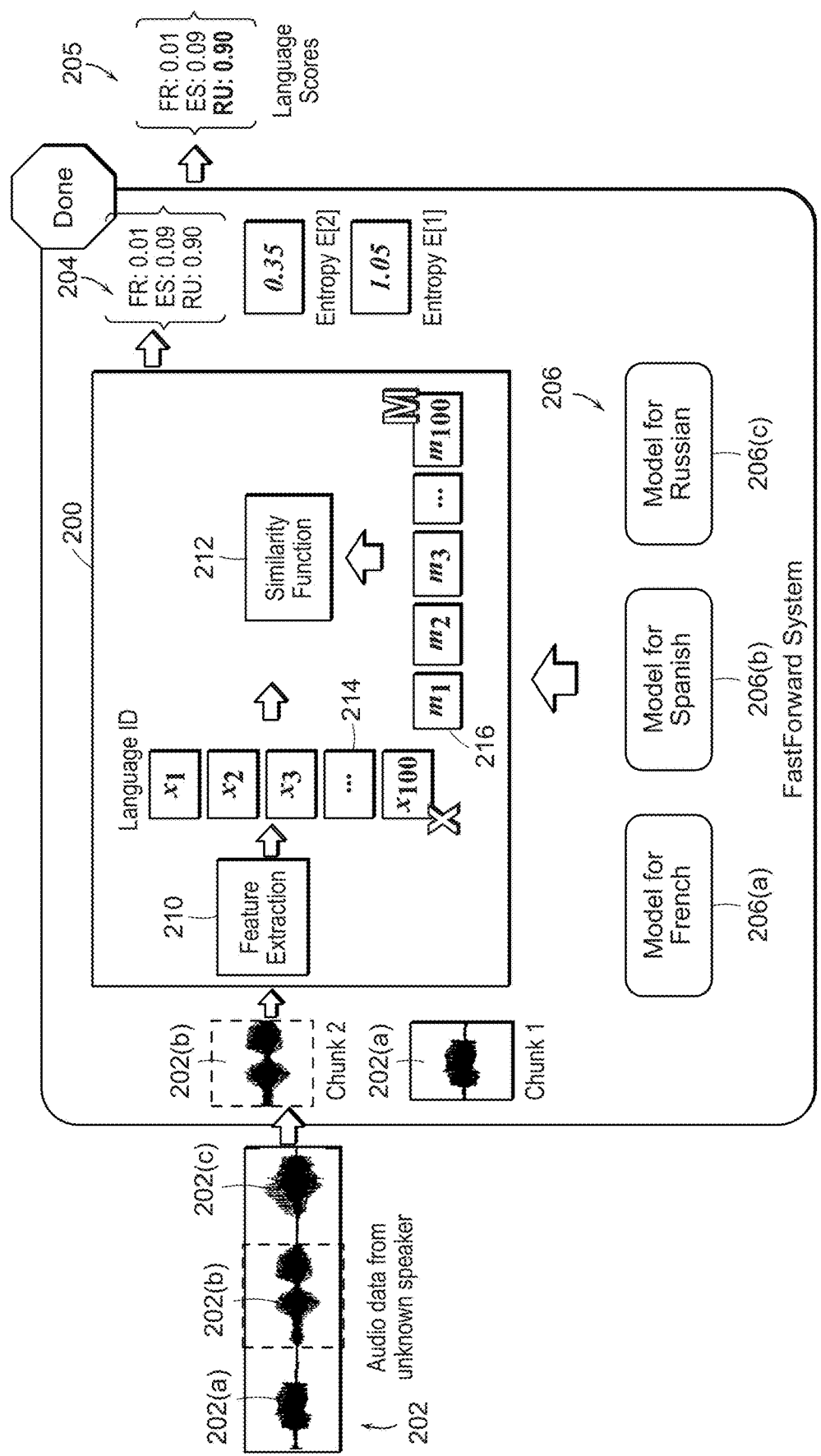

FIGS. 7A through 7B include schematic block diagrams which illustrate identification of a language in unknown audio, after processing fewer than all segments of input audio, according to some exemplary embodiments. Referring to FIG. 7A, the processing for the first input audio data segment or chunk 202(a) is illustrated. The calculated probability scores 204 for the first chunk 202(a) are: French—0.33, Spanish—0.33, Russian—0.33. The entropy calculated for these probability scores is 1.09. It is noted that no final probability scores 205 are reported, since the processing has not completed or been terminated.

Next, as illustrated in FIG. 7B, the processing for the second input audio data segment or chuck 202(b) is illustrated. The calculated probability scores 204 for the second chunk 202(b) are: French—0.01, Spanish—0.09, Russian—0.90. The entropy calculated for these probability scores is 0.35. According to the present disclosure, because the entropy decreased over the entropy for the previous chunk 202(a), processing is stopped. Final probability scores 205 are reported as the probability scores 204 for the second chunk 202(b), i.e., French—0.01, Spanish—0.09, Russian—0.90, since the processing has been terminated. This early termination of processing results in a reduction in the processing load and time, resulting in a more efficient language identification process and system.

The output of language identification system 200 is the set of probability scores 205. In some exemplary systems, the highest score can be interpreted as being the identified language. Thus, in the case of FIGS. 6A-6C, the results can be interpreted to identify the language in the unknown input audio as French, and, in the case of FIGS. 7A and 7B, the results can be interpreted to identify the language in the unknown input audio as Russian. Processing more data will result in more accurate probability estimates, but the use of entropy according to the present disclosure indicates the top score is unlikely to change. In general, the use of the top scoring label versus the set of probabilities is determined by external systems or the user of the output.

Hence, the approach of the invention saves considerable processing cost and time because of its ability to eliminate the processing of large amounts of audio data. In particular, reducing usage of feature extraction module 210 is beneficial, especially since, under operation, that is where the bulk of processing time and cost is expended.

As described above in detail, according to the present disclosure, the language identification processing proceeds in chunks or segments. In some particular exemplary embodiments, the processing of a particular chunk builds on the information identified from the previous chunk or chunks. In these embodiments, a layer of the network keeps a running tally of statistics. To obtain the result, the state from previous chunks is maintained, so subsequent chunks incorporate the information from one or more previous chunks. The effect is the same, i.e., when the system receives data for a particular chunk, it only processes the audio data of that chunk.

Whereas many alterations and modifications of the disclosure will become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

The invention claimed is:

1. A system for identifying a language in audio data, comprising:
a feature extraction module for receiving an unknown input audio data stream and dividing the unknown input audio data stream into a plurality of segments of unknown input audio data;
a similarity module for receiving the plurality of segments of the unknown input audio data and for receiving a plurality of known-language audio data models for a respective plurality of known languages, for each segment of the unknown input audio data, the similarity module performing comparisons between the segment of unknown input audio data and the plurality of known-language audio data models and generating a respective plurality of probability values representative of the probabilities that the segment includes audio data of the known languages; and
a processor for receiving the plurality of probability values for each segment and computing an entropy value for the probabilities for each segment, and identifying the language in the audio data based on the generated probabilities; wherein
if the entropy value for a segment is less than the entropy value for a previous segment, the processor terminates the comparisons prior to completing comparisons for all segments of the unknown input audio data.

2. The system of claim 1, wherein each segment of unknown audio data comprises an unknown data vector comprising a plurality of data values associated with the segment of unknown input audio data; and each known-language audio data model comprises a known data vector comprising a plurality of data values associate with the known-language audio data model.

3. The system of claim 1, wherein the feature extraction module comprises a deep neural network.

4. The system of claim 1, wherein the similarity module performs a probabilistic linear discriminant analysis (PLDA) in generating the plurality of probability values.

5. The system of claim 1, wherein extents of each segment are defined by a time duration.

6. The system of claim 1, wherein extents of each segment are defined by a quantity of data in the segment.

7. A method for identifying a language in audio data, comprising:
receiving, at a feature extraction module, an unknown input audio data stream and dividing the unknown input audio data stream into a plurality of segments of unknown input audio data;
receiving, at a similarity module, the plurality of segments of the unknown input audio data and receiving, at the similarity module, a plurality of known-language audio data models for a respective plurality of known languages, for each segment of the unknown input audio data, the similarity module performing comparisons between the segment of unknown input audio data and the plurality of known-language audio data models and generating a respective plurality of probability values representative of the probabilities that the segment includes audio data of the known languages;
computing an entropy value for the probabilities for each segment;
identifying the language in the audio data based on the generated probabilities; and
if the entropy value for a segment is less than the entropy value for a precious segment, terminating the comparisons prior to completing comparisons for all segments of the unknown input audio data.

8. The method of claim 7, wherein each segment of unknown audio data comprises an unknown data vector comprising a plurality of data values associated with the segment of unknown input audio data; and each known-language audio data model comprises a known data vector comprising a plurality of data values associate with the known-language audio data model.

9. The method of claim 7, wherein the feature extraction module comprises a deep neural network.

10. The method of claim 7, wherein the similarity module performs a probabilistic linear discriminant analysis (PLDA) in generating the plurality of probability values.

11. The method of claim 7, wherein extents of each segment are defined by a time duration.

12. The method of claim 7, wherein extents of each segment are defined by a quantity of data in the segment.

* * * * *